United States Patent [19]

Biricik et al.

[11] 4,189,656
[45] Feb. 19, 1980

[54] CATHODE STRUCTURE FOR A HIGH POWER LASER

[75] Inventors: Vahram W. Biricik, Rancho Palos Verdes; Kang R. Chun, Pacific Palisades; Laurence S. Gresko, Long Beach, all of Calif.

[73] Assignee: Northrop Corporation, Los Angeles, Calif.

[21] Appl. No.: 905,511

[22] Filed: May 12, 1978

[51] Int. Cl.² .......................... H01J 1/13; H01J 61/52
[52] U.S. Cl. ........................................ 313/37; 313/32; 313/310
[58] Field of Search ...................... 313/310, 37, 30, 32; 331/94.5 PE (U.S. only)

[56] References Cited

U.S. PATENT DOCUMENTS 2,227,039  12/1940  Smith et al. ............................. 313/32

Primary Examiner—Robert Segal
Attorney, Agent, or Firm—Edward A. Sokolski

[57] ABSTRACT

A cathode structure for a high power laser is formed from a first sheet of a hard metallic material such as molybdenum, which is joined to a second sheet of the same material by brazing, these first two sheets being brazed to a support structure of the same material. The first two sheets have a plurality of side by side longitudinal channels formed therein, the channels of one of these sheets being positioned between the channels of the other sheet (in a 180° spatial phase relationship therewith). Crosswise channels are provided along opposite edges of both of the sheets to provide fluid communications to the opposite ends of the longitudinal channels. A cooling liquid such as water is fed to the transverse channels, and circulated through the longitudinal channels in parallel to effect efficient cooling of the cathode. The cathode is assembled by placing a thin foil of brazing material, such as a suitable gold/copper/nickel alloy, between the two channeled sheets and between one of the sheets and the support plate. Thin wires of hard material such as molybdenum are tack welded to the foil surfaces facing the channeled sheets, these wires running parallel to each other and normal to the direction of the channels. This structure is then placed in an airtight compartment and pressed between die surfaces. The compartment is then evacuated and the dies heated such as by electrical resistance to melt the brazing material and braze the cathode parts together to form an integral unit.

4 Claims, 6 Drawing Figures

CATHODE STRUCTURE FOR A HIGH POWER LASER

The U.S. Government has rights in this invention pursuant to Air Force Contract No. F 29601-76-C-0006.

This invention relates to lasers, and more particularly to a cathode structure for a high power laser and the method of fabricating this structure.

High power gas lasers have been developed in the prior art which employ an electron beam which is generated in an area gun external of the laser cavity. In these devices, the electron beam runs transverse of the laser cavity, passing through a thin metallic foil which serves both as an anode and a wall of the laser cavity. An area electron gun of the type suitable for generating an electron beam for a high power laser is described in U.S. Pat. No. 3,956,712 issued May 11, 1976, and assigned to the Northrop Corporation, the assignee of the present application. High power electron beam lasers of the aforementioned type are described in U.S. Pat. No. 3,970,964 issued July 20, 1976, and U.S. Pat. No. 4,073,192 issued Dec. 13, 1977, both of these patents being assigned to Northrop Corporation. The area electron beam in such electron beam lasers, after it is accelerated through the foil anode and passes through the lasing medium, strikes against a cathode surface usually formed on a wall of the laser cavity and induces secondary emission from this surface, the energy of the beam otherwise being dissipated in the cathode. In typical high power lasers, the laser cavity has a relatively large volume, with the abode and cathode each having substantial surface areas (e.g. of the order of 4 sq. ft.). In order to avoid overheating of the cathode, which could result in a significant drop in laser efficiency as well as damage to the laser components, it is necessary that an efficient cooling system be provided for the cathode and that the cathode be designed for optimum dissipation. It is further necessary that the surface of the cathode be precisely flat and smooth so as to avoid interference with the laser beam. It is further to be noted that large heat fluxes are generated during the electrical discharge in the laser cavity, further contributing to the heating of the cathode.

The present invention provides a large area flat cathode structure which meets all of the requirements referred to above. First, a highly efficient cooling structure is provided by means of cooling channels formed in a pair of sheets which are joined to each other and to a back plate to form an integral cathode structure. The channels in these sheets are staggered relative to each other so as to afford maximum cooling over the entire surface of the cathode, cooling fluid being fed through the channels in parallel from and to manifolds formed by transverse slots running along the opposite edges of the cooling channels. Further, a unique method for assembling the cathode structure in a simple yet highly efficient manner is described, the two cathode sheets and the backing plate being brazed together by placing sheets of brazing foil between the various members and then heating the brazing material while the members are being clamped together and held in a vacuum environment.

It is therefore an object of this invention to provide an area cathode for a high power electron beam laser which is adapted to efficiently dissipate heat.

It is still a further object of this invention to provide efficient means for assembling a cathode structure for high power electron beam lasers.

Other objects of this invention will become apparent as the description proceeds in connection with the accompanying drawings, of which:

Figure 1:
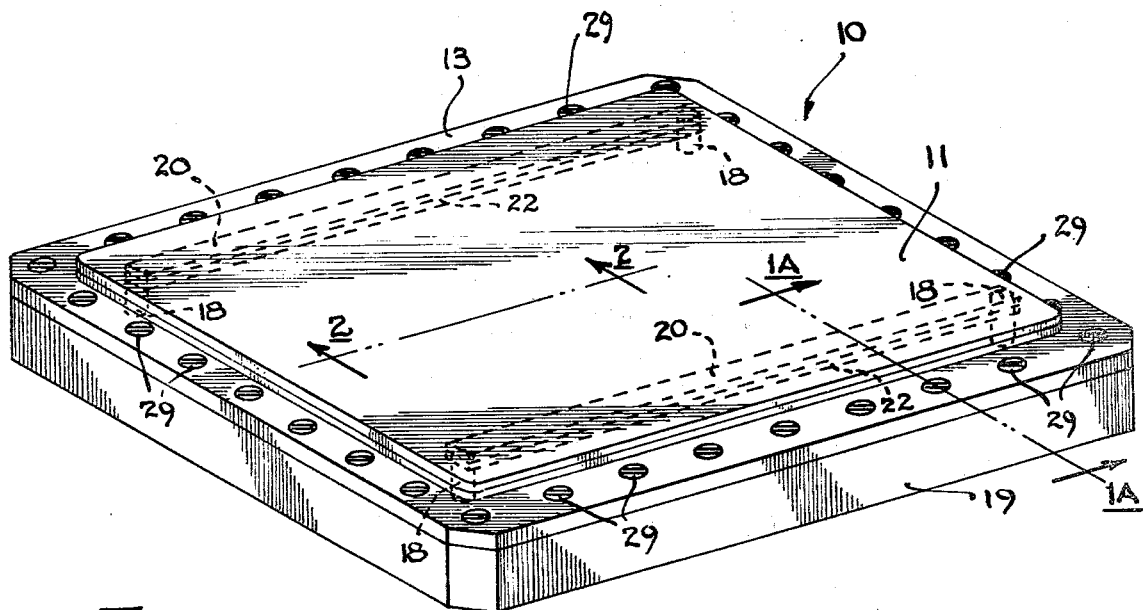
FIG. 1 is a perspective view of a preferred embodiment of the invention.
Figure 1A:
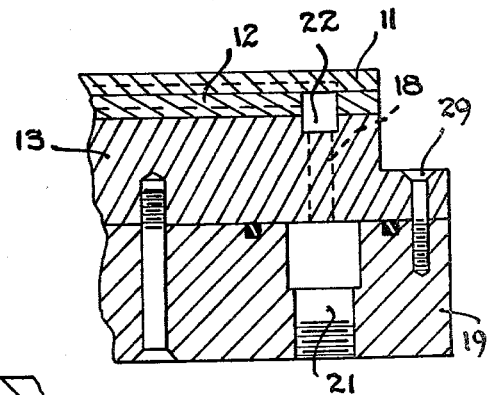
FIG. 1A is a partial cross-sectional view taken along the plane indicated by 1A—1A in FIG. 1.
Figure 2:
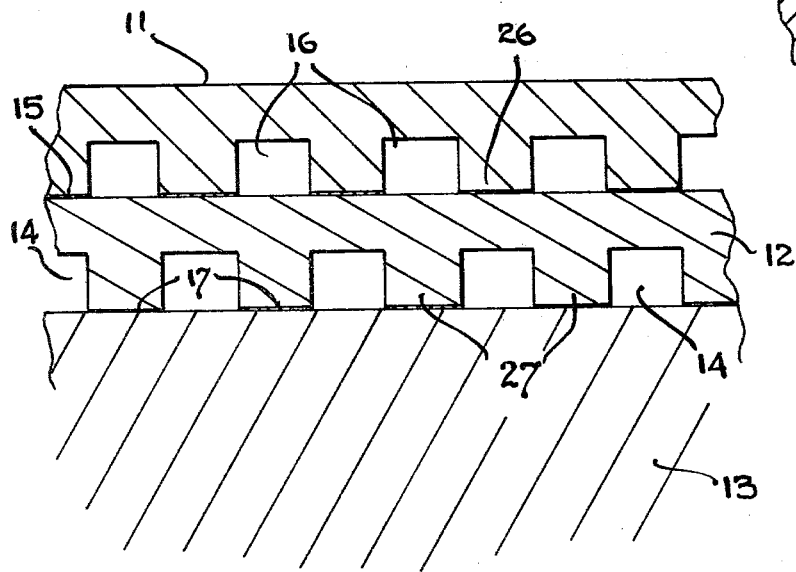
FIG. 2 is a cross-sectional view taken along the plane indicated by 2—2 in FIG. 1.

Referring now to FIGS. 1 and 2, a preferred embodiment of the cathode structure of the invention is illustrated. The structure is formed from a first metallic sheet 11 having a plurality of longitudinal substantially parallel grooves 16 formed therein, a second metallic sheet 12 having a plurality of longitudinal substantially parallel grooves 14 formed therein, a base plate 13 which forms a structural support member for the two sheets and a mounting plate 19 to which the cathode is attached by means of screws 29 for use in mounting the cathode as may be desired. Sheets 11 and 12 are similar in structure and are brazed together to form an integral unit at areas 15 as by a technique to be described further on in the specification. Channels 16 and 14 run substantially parallel to each other and are staggered wtih respect to each other, ie., they are in a 180° spatial relationship. Inlet 21 is provided to which a line (not shown) is connected for feeding cooling fluid to one of manifolds 22, a similar outlet (not shown) being located in the other of manifolds 22. Sheet 12 is brazed to plate 13 at areas 17, an integral structure thus being formed between sheets 11 and 12 and plate 13. Sheets 11 and 12 and plate 13 are preferably made of a hard material having high thermal conductivity, such as molybdenum. In a typical operative embodiment of the invention, sheets 11 and 12 and plate 13 have top surface areas of the order of 4 square feet, with sheets 11 and 12 each having a thickness of the order of 0.125 inches and plate 13 having a thickness of the order of 1.0 inches. In this embodiment, channels 14 and 16 are of the order of 0.078 inches both high and wide and are separated by land portions 26 and 27 of the same dimensions.

Figure 3:
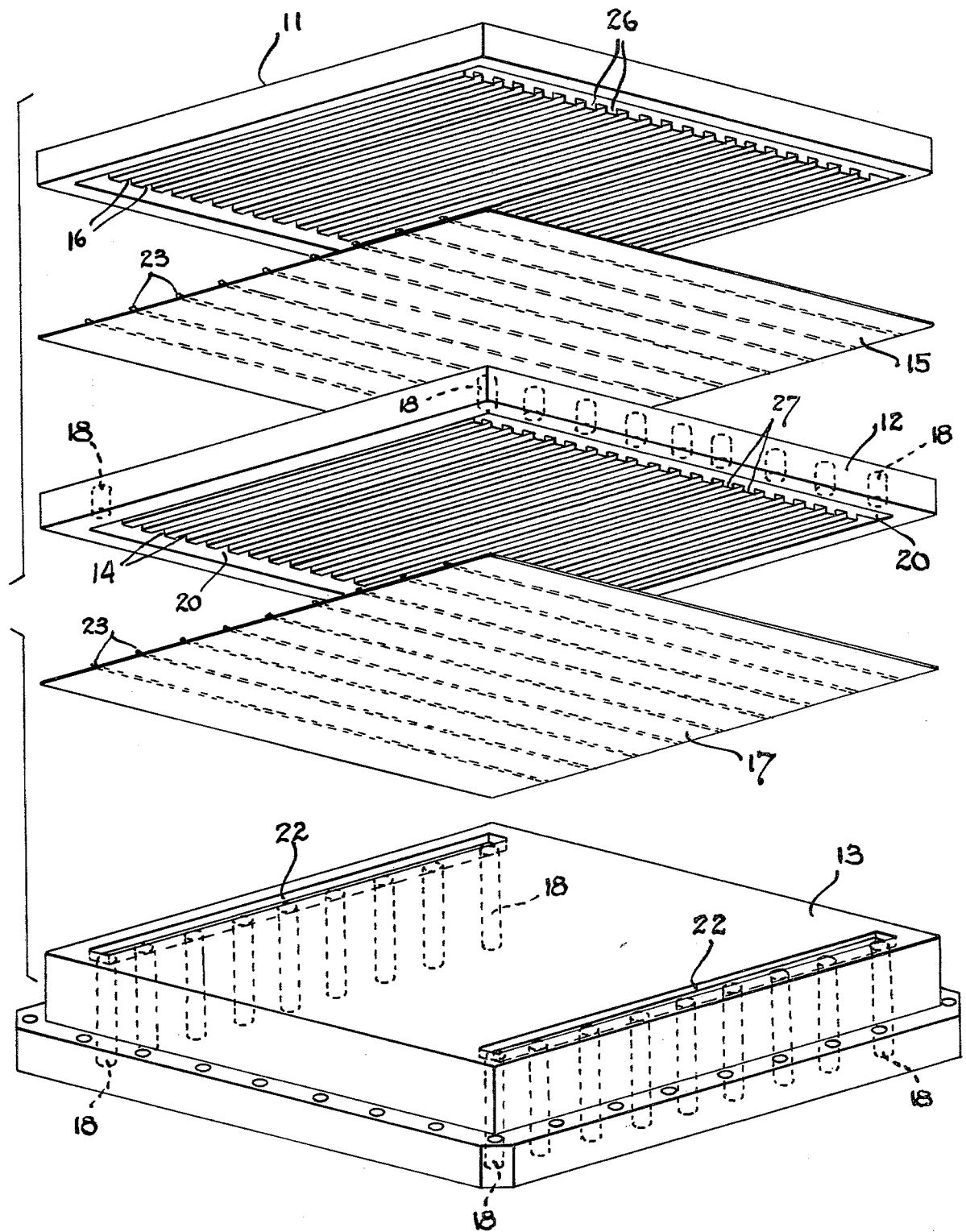
FIG. 3 is an exploded view illustrating the assembly of the cathode structure in the preferred embodiment of the invention.

Referring now to FIG. 3, formed in sheet 12 and running transversely to channels 16 along the opposite edges thereof, are slots 20 forming manifolds, there further being similar slots 22 formed in the top surface of plate 13 which form manifolds along the opposite edges of channel 14, these slots being in fluid communication with slots 20 of sheet 12. Slots 20 and 22 form manifolds to which a cooling fluid such as water is fed on one side of grooves 14 and 16 and removed on the other sides of these grooves by means of channels 18 formed in plate 13 and sheet 12. This cooling fluid is circulated through channels 14 and 16 to effect the efficient cooling of the cathode. It is to be noted that the staggered relationship between channels 14 and 16 affords more uniform cooling of the cathode surface.

Figure 4:
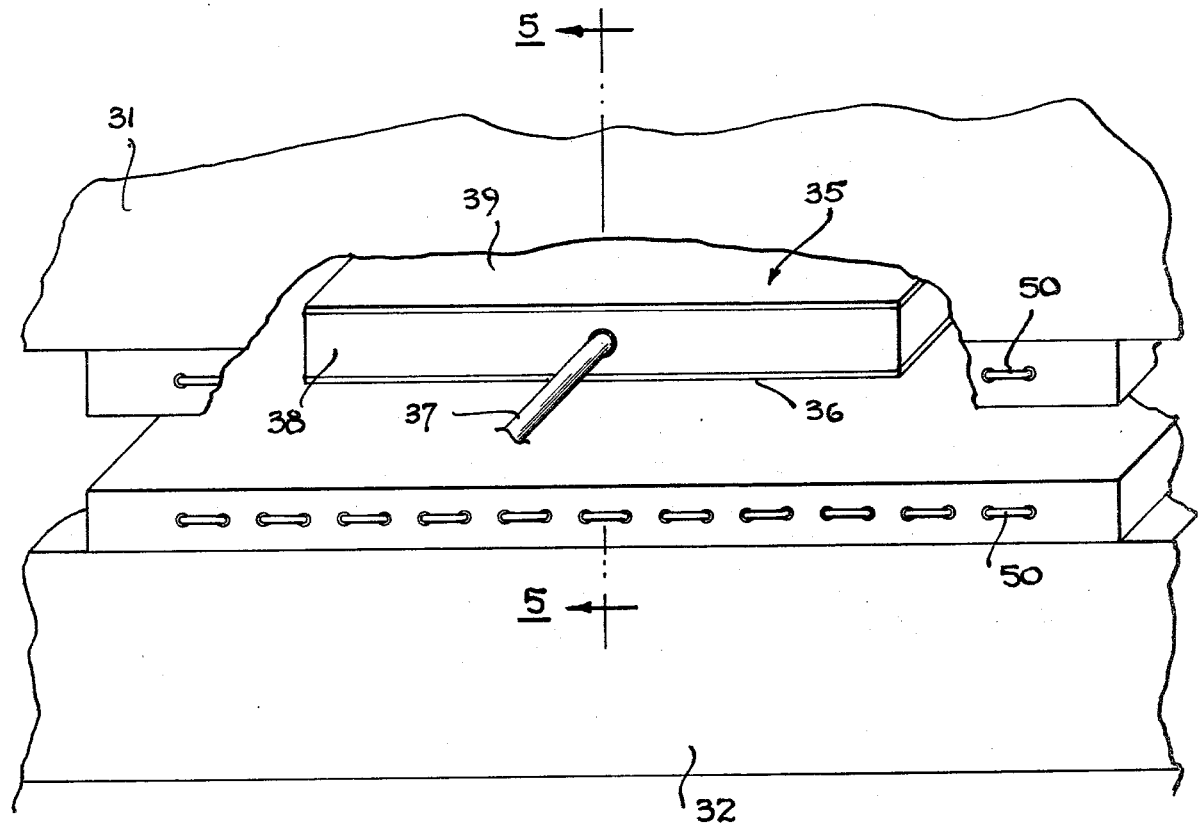
FIG. 4 is a perspective view illustrating assembly of the preferred embodiment of the invention in a vacuum tight compartment between a pair of pressure dies.
Figure 5:
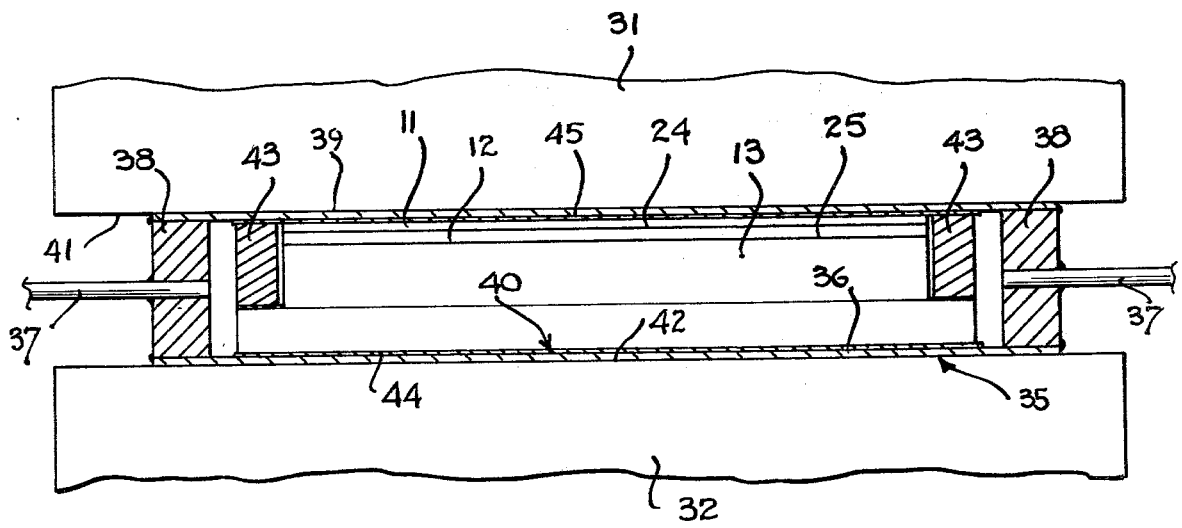
FIG. 5 is a cross-sectional view taken along the plane indicated by 5—5 in FIG. 4.

Referring now to FIGS. 3–5, the assembly of the preferred embodiment of the invention is illustrated. As first shown in FIG. 3, a first thin foil 15 of brazing material is sandwiched between the channeled surface of sheet 11 and the unchanneled (flat) surface of sheet 12. A second foil of brazing material 17 is sandwiched between the grooved surface of sheet 12 and the top surface of support plate 13. The brazing foil 15 and 17 may be of a material commercially available as NICORO 80, which is a composition of approximately 82% gold, 16% copper and 2% nickel, and having a thickness of approximately 0.0025 mils. Foils 15 and 17 have thin wires 23 tack welded to the surfaces thereof facing plates 11 and 12 respectively. Wires 23 are of a hard material such as molybdenum and may be of the order of 0.0015 inches in diameter. The wires for each foil are spaced from each other in parallel ralationship and run normal to the cooling channels of the sheets which they face.

Reffering now to FIGS. 4 and 5, the cathode is assembled as follows: Sheets 11 and 12 and plate 13 and foils 15 and 17 are placed in overlying relationship within compartment 35. The wires 23 act as spacers between the members so that excess melted braze material does not plug up the channels. These wires also act to establish the braze thickness after the braze material is melted. Compartment 35 is formed from a bottom plate 36 which rests on the top flat surface 42 of die 32 and a top plate 39 on which the flat bottom surface 41 of die 31 rests. Compartment 35 has a side wall structure 38 which is welded to plates 36 and 39 along their edges to join the top and bottom walls together to form an airtight seal. Thin separator sheets 44 and 45 (of the order of 0.020 inches thick) which are coated with a material such as titanium oxide, are placed respectively between plates 36 and 39 and the cathode to prevent the brazing of the cathode to these plates. The ends of sheet 44 are notched to facilitate fluid communication between the channels 14 of plate 12 and the vacuum line during evacuation. Bars 43 are provided to support the ends of sheet 45. Top and bottom plates 36 and 39 are preferably made very thin (of the order of 0.020 inches) so as to afford uniform pressure over the surfaces of the members to be joined together in response to the die pressure.

The compartment 35 is first evacuated through line 37 to provide a vacuum environment within such compartment. Then dies 31 and 32 are heated by means such as electrical resistance heaters 50 so as to melt the brazing foils 15 and 17 to braze the cathode parts together. After the brazing has been effected to provide braze joints 24 and 25 along the lands between the channels, and the work piece has cooled, the tooling is removed and the top surface of sheet 11 which forms the top surface of the cathode is ground precisely flat to its final dimensions.

While the invention has been described and illustrated in detail, it is to be clearly understood that this is intended by way of illustration and example only and is not to be taken by way of limitation, the spirit and scope of this invention being limited only by terms of the following claims.

We claim:

1. A cathode structure for a high power laser comprising:
    first and second thermally conductive sheets, each having a plurality of side by side longitudinal grooves separated by land portions formed in one of the broad surfaces thereof, the surface of each of said sheets opposite to said one surface thereof being substantially flat,
    means for joining said sheets together with the land portions of said first sheet bonded to the opposite surface of said second sheet, thereby forming a first set of longitudinal channels between said sheets,
    a base plate having a substantially flat surface,
    means for joining the second sheet to said base plate with the land portions of said second sheet bonded to said flat surface of said base plate, thereby forming a second set of longitudinal channels between said base plate and said second sheet, and
    means for feeding cooling fluid to said channels at one end thereof and removing said fluid from said channels at the other end thereof,
    the first and second sets of channels being substantially parallel to each other with the second set of channels staggered between the first set of channels in substantially 180° spatial relationship thereto.

2. The cathode structure of claim 1 wherein the first and second sheets and said base plate are joined together by brazing.

3. The cathode structure of claim 1 wherein the width of the grooves is substantially equal to the width of the lands separating said grooves.

4. The cathode structure of claims 1, 2 or 3 wherein the means for feeding cooling fluid to said channels comprises a first pair of slots running transversely to said channels forming manifolds at opposite ends of said first set of channels and a second pair of slots running transversely to said channels forming manifolds at opposite ends of said second set of channels and first channel means for interconnecting one of the slots of each pair and second channel means for interconnecting the other of the slots of each pair.

* * * * *